US008423882B2

(12) United States Patent
Correl

(10) Patent No.: US 8,423,882 B2
(45) Date of Patent: Apr. 16, 2013

(54) ONLINE NAVIGATION OF CHOICE DATA SETS

(75) Inventor: Stephen F Correl, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 987 days.

(21) Appl. No.: 12/038,123

(22) Filed: Feb. 27, 2008

(65) Prior Publication Data

US 2009/0217172 A1 Aug. 27, 2009

(51) Int. Cl.
*G06F 3/00* (2006.01)

(52) U.S. Cl.
USPC .......................... 715/206; 715/733; 715/738

(58) Field of Classification Search .......... 715/205–208, 715/345, 709, 733, 738
See application file for complete search history.

(56) References Cited

U.S. PATENT DOCUMENTS

| 6,092,072 | A  | * | 7/2000 | Guha et al. | 707/700 |
| 6,738,082 | B1 | * | 5/2004 | Dong et al. | 715/769 |
| 7,003,719 | B1 | * | 2/2006 | Rosenoff et al. | 715/205 |
| 7,181,438 | B1 |   | 2/2007 | Szabo | |
| 7,213,198 | B1 | * | 5/2007 | Harik | 715/234 |
| 7,333,966 | B2 | * | 2/2008 | Dozier | 706/21 |
| 7,467,349 | B1 | * | 12/2008 | Bryar et al. | 715/205 |
| 2006/0184461 | A1 | * | 8/2006 | Mori | 706/13 |
| 2008/0021755 | A1 | * | 1/2008 | Jones et al. | 705/8 |
| 2009/0192986 | A1 | * | 7/2009 | Garg et al. | 707/3 |

OTHER PUBLICATIONS

Wu et al., Induction Variable Analysis Without Idiom Recognition: Beyond Monotonicity.
Pop et al., Induction Variable Analysis With Delayed Abstractions.
Levine et al., Data Without (Operational) Variables, Dec. 6, 2000.

* cited by examiner

*Primary Examiner* — Andrea Leggett
(74) *Attorney, Agent, or Firm* — Lieberman & Brandsdorfer, LLC

(57) ABSTRACT

A method and system are provided for communicating with a dynamic online database to display choices within the database. Groups of data within the database are classified through the use of a cluster analysis technique. This technique provides a navigation map of the online database. Choices that are determined to be related are conveyed as such in the navigation map. One or more navigation pages are created and presented to a user responsive to an action on a link for a choice provided in the navigation map.

15 Claims, 5 Drawing Sheets

ONLINE NAVIGATION OF CHOICE DATA SETS

BACKGROUND OF THE INVENTION

1. Technical Field

This invention relates to navigating an online database. More specifically, the invention pertains to applying a cluster analysis technique to the online database and returning one or more pages with hyperlinks to relevant data.

2. Description Of The Prior Art

In the ever evolving world of electronic commerce, large quantities of data are available over a wide area network. Many domains exist in commerce or other areas where choices are exercised by a large population of people and the selection of these choices are published or otherwise made available to members of the public over the wide area network. One example of the selection and display is seen in an online catalog where consumers browse and search for product. From time to time, consumers may select one or more searched products to purchase. In one embodiment, the consumer may browse among selections made by other people who previously searched the site for the same or similar products. The set of choices available to consumers, together with the set of selections made by people among those choices comprise an online database.

One example of an online database available to search for product is Amazon.com. On the Amazon.com web site, the set of products available for sale and purchase by a consumer together with a set of one or more purchases of product made by other consumers, form a database of choices. Consumers may navigate web pages on this site to find product to purchase based upon this database. In one embodiment, the web site provides the consumer with information about purchase patterns to assist the consumer in navigating the wealth of product available to purchase. For example, one or more recommendations may be made to the consumer based upon information collected about the consumer.

Another example of the online database pertains to survey data and compiling data from the surveys. For surveys that are conducted online, large quantities of people are polled to solicit responses about public opinion. Data provided in response to the polling questions is gathered. In one embodiment, results of the survey are published showing statistical results for each question in the form of one or more number tables or graphical summaries.

The prior art data analysis does not provide an unbiased selection of correlation within the data. With respect to voting, summaries of votes on a per question basis are shown. What is not shown in the data output is how votes coincide with votes on one or more other questions. Similarly, with respect to product purchases, recommendations of product are provided. However, such recommendations are programmed into the web site based on user's past behavior and stated preferences. The recommendations provided on the electronic commerce site do not enable the user to navigate patterns of choices by other consumers.

With respect to either product purchase or survey data, consumers who want to explore new territory are often frustrated when given recommendations based upon previous choices. The previous choices are generally limited to a biased view of data.

Therefore, there is a need for systematic rationale that supports navigation of choice patterns within a database. Although the information currently provided to the consumer is interesting, the data underlying the information is static and does not support general purpose navigation there through.

Since databases are constantly changing with addition of new data, the navigation of the database should support the dynamic nature of the online database. Accordingly, there is a need for a tool to support and enable navigation of patterns established in a database, wherein the tool takes advantage of the dynamic characteristic of the database.

SUMMARY OF THE INVENTION

This invention comprises a method, system, and article for navigating a dynamic online database to identify subsets of user choices and how they intersect.

In one aspect of the invention, the method for navigating an online dynamic database includes maintaining the dynamic online database configured to receive data subject to parsing. At least one subset of data is identified within the database available as a set of user choices. A cluster analysis technique is applied to further identify at least one first subset of interest within the set of user choices. The cluster analysis technique identifies choices within the first subset of interest that are equivalent to each other according to at least one equivalence function. Thereafter, at least one function is applied to each subset of interest to estimate significance of each subset to a human navigator. An intersection between at least one identified subset of interest and another identified subset of interest is measured to further identify subsets of closely related data. One or more pages of data showing identified subsets of highest significance are generated, together with the measured intersection.

In another aspect of the invention, a computer system is provided with a processor in communication with storage media, and a dynamic online database maintained on the storage media. The database is configured to receive data and to have the data parsed. A choice manager is provided in the system in communication with the database to identify at least one subset of interest within a set of user choices. In addition, a block manager is provided in communication with the choice manager. The block manager applies a cluster analysis technique to further identify at least one first subset of interest within the set of user choices, such that each choice within the first subset is equivalent to each other according to at least one equivalence function. A navigation manager is provided to apply at least one function to the subset of interest to estimate significance of each subset to a human navigator, and to measure an intersection between at least the identified subset of interest and another identified subset of interest to further identify subsets of closely related data. A page of data is provided to the human navigator to show a measured intersection between sets of identified data.

In yet another aspect of the invention, a computer program product comprising a computer useable medium including a computer readable program is provided, wherein the computer readable program when executed on a computer causes the computer to navigate an online dynamic database. Instructions are provided to maintain the dynamic online database configured to receive data, and to configure the database to identify pertinent data subject to parsing. At least one subset of data within the database available as a set of user choices is identified. A cluster analysis technique is applied to further identify at least one first subset of interest within the set of user choices. Instructions are provided to identify multiple subsets of interest within the set of user choices. The members of each subset within these subsets of interest are equivalent to each other according to an equivalence function. Instructions are provided to apply at least one function to the subset of interest to estimate significance of each subset to a human navigator. In addition, instructions are provided to measure an intersection between at least one identified subset of interest and another identified subset of interest to further identify subsets of closely related data; and to generate at least one page of data showing identified subsets of highest significance, together with said measured intersection.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

Within the scope of this invention, web pages are generated to display choices made within an online dynamic database. An online database is commonly known to be a database accessible via a network. A dynamic online database refers to a collection of records that is queried or updated over a wide area network, such as the Internet, so that its contents change over time as a result of user actions. Examples of a dynamic online database include but are not limited to a web site showing the results of online polls, or a web site of items for sale showing pricing, availability, and related products. A cluster analysis technique is applied to the online database to classify groups of data based upon characteristics of the data. The results of the application of the cluster analysis technique include a navigation map embedded as a link within the online database. Choices that are discovered to be related can be linked together. A new navigation page is created and presented to a user in response to acting upon the linked choices. In one embodiment, one or more additional or closely related choices may be presented to the user in response to the user acting upon a prior linked choice. Similarly, in one embodiment, related choices may be cached to accommodate frequent access. Accordingly, entries which may be of interest are found in the online database by navigating among the linked choices generated by use of the cluster analysis technique.

Technical Details

As noted above, a cluster analysis technique is applied to the online database to classify groups of data based upon characteristics of the data. Block modeling is one technique within cluster analysis. For purposes of description, the term block modeling will be employed as one form of cluster analysis, although the invention should not be limited to the block modeling technique within cluster analysis. Block modeling is an empirical procedure based on the idea that units in a network can be grouped according to the extent that they are deemed equivalent based upon a meaningful definition of equivalence. The goal of block modeling is to reduce a large, potentially incoherent network to a small comprehensible structure that can be readily interpreted. One of the main procedural goals of block modeling is to identify clusters of units in a given network that share structural characteristics.

An existing online database is utilized to identify a cluster of units in a network through the use of block pages and choice pages. Both the block page and the choice page are defined in detail below. Navigation hyperlinks are added to the choice page to link to a new online navigation block page generated by the block modeling technique employed.

Figure 1:
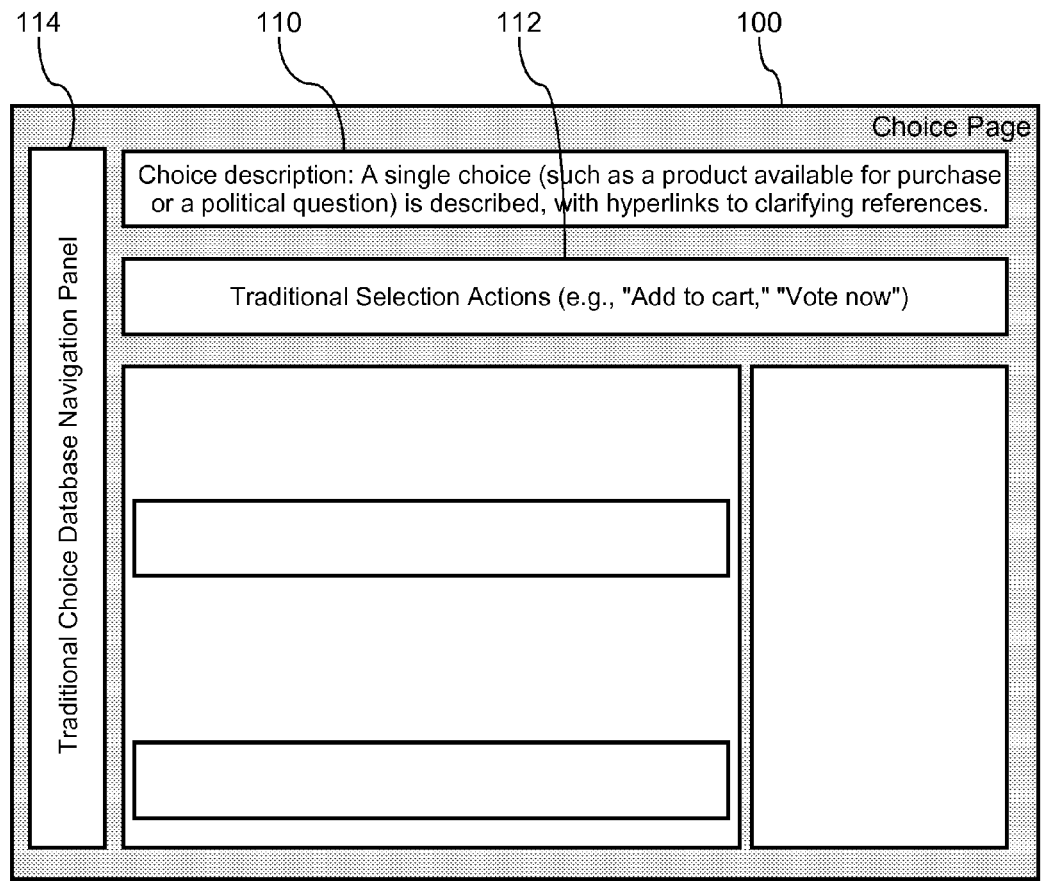
FIG. 1 is a block diagram of a prior art choice page.

A choice page is a tool that describes a choice available within the online database. FIG. 1 is a block diagram (100) of a prior art choice page. As shown, a choice description field (110) is provided to describe a single choice. In the case of an online retailer, the choice description field (110) may describe a product for sale. Similarly, in the case of a survey or poll, the choice description field (110) may describe a survey or poll question together with the current results on the question. In addition to the choice description field, an action selection field (112) is provided, as well as a navigation panel (114). The action selection field (112) provides a user with traditional selection actions within the database. For example, in the case of an online retailer the action selection may be to add a product to your shopping cart, and in the case of a survey the action selection may be to exercise your vote, etc. The navigation panel (114) includes a list of one or more icons or links to the database. Accordingly, the prior art choice page provides three sections in which one or more selections are provided to be applied to the associated online database.

Figure 2:
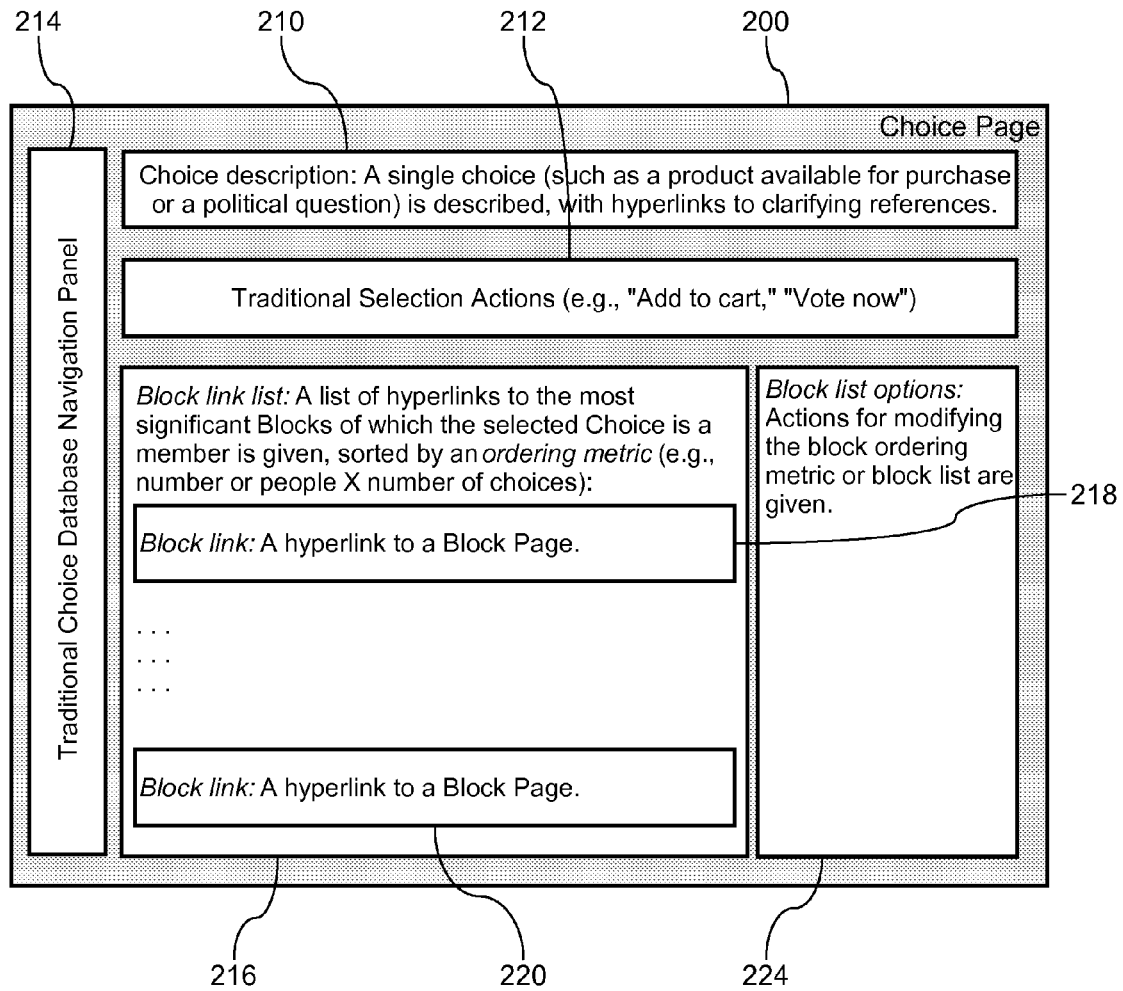
FIG. 2 is a block diagram of a modified choice page.

As noted above, the choice page is modified with navigation options and navigation information to enable a user of the online database to follow selection patterns of other consumers to find related choices. FIG. 2 is a block diagram (200) of a modified choice page. As shown, the modified choice page includes the choice selection field (210), the action selection field (212), and the navigation panel (214) identical to those described above in FIG. 1. In addition to these fields, the choice page includes a block link list (216) which is a list of one or more hyperlinks to blocks where the selected choice is a member. As shown in this example, there are two block links shown in the list (218) and (220). In one embodiment, the list may be expanded to include additional block links. Each block link includes a hyperlink to a block page. The block page is separate from the choice page (200). In one embodiment, the block links (218) and (220) are sorted by an ordering metric. Similarly, although the description herein provides two block links in the list, the invention should not be limited to this quantity. In one embodiment, the list may include a fewer or greater amount of block links depending upon the criteria applied to select the blocks for the block link list. The choice page also includes a block list option field (224), which includes the criteria associated with the ordering of the block link list (216). For example, in one embodiment, the block list options field (224) may include criteria applied to select the block links, the criteria applied to order the block links, etc. Accordingly, the choice page includes a plurality of fields to organize hyperlinks to data in an online database.

Figure 3:
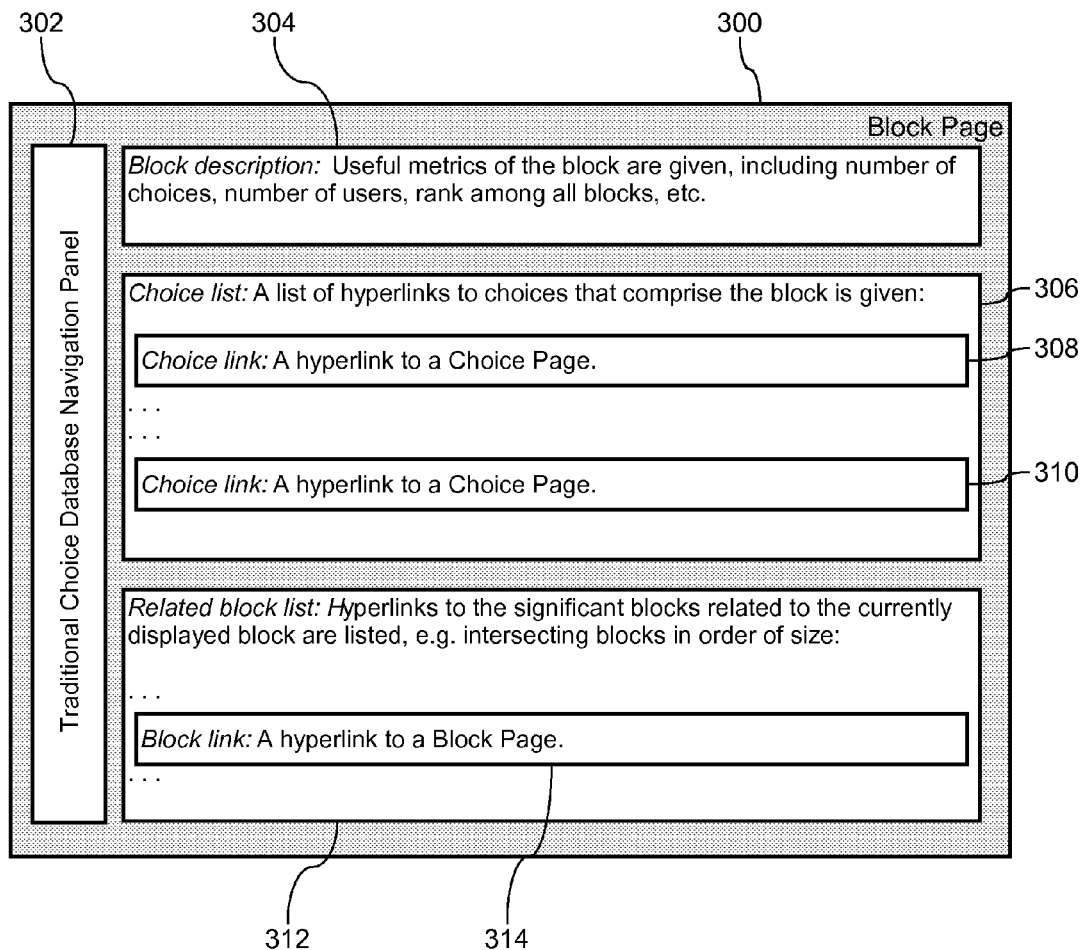
FIG. 3 is a block diagram of a block page according to the preferred embodiment of this invention, and is suggested for printing on the first page of the issued patent.

The choice page functions in conjunction with the block page. The block page is a generated navigation page that describes an aggregation of users' selection of choices in the online database. FIG. 3 is a block diagram (300) of a block page. As shown, the page includes a navigation panel (302) and information architecture available for navigation. Similar to the choice page (100), the navigation panel (302) in the block page (300) includes a list of one or more icons or links to the database. In addition to the navigation panel, the block page (300) includes a block description field (304) which provides metrics pertaining to the block. More specifically, the block page describes an aggregation of a selection of choices. The metric in the block description field (304) is data that may include the quantity of choices, the number of users, a rank of the specific block among all blocks, etc. In addition to the block description, both a choice list (306) and a related block list (312) are provided. The choice list (306) is a list of hyperlinks to choices that comprise the block. Within the choice list are choice links (308) and (310). Each choice link (308) and (310) is a hyperlink to a choice page. In one embodiment, the quantity of choice links may be fewer or greater than the quantity shown herein. Accordingly, the invention should not be limited to the quantity of choice links display herein.

In addition to the choice list (306) and associated choice links (308) and (310), the block page may include a related block list (312). This field (312) provides one or more hyper links (314) to significant blocks that are related to the currently displayed block. In one embodiment, the hyperlinks provided in the related block list are listed in order of size. However, other criteria may be applied to the ordering of the hyperlinks, and as such, the invention should not be limited to ordering based upon size. Similarly, different criteria may be applied to determine related blocks. Accordingly, the block page (300) provides metrics on the block itself, allows navigation to choices that comprise the page, and allows navigation among other related blocks.

Figure 4:
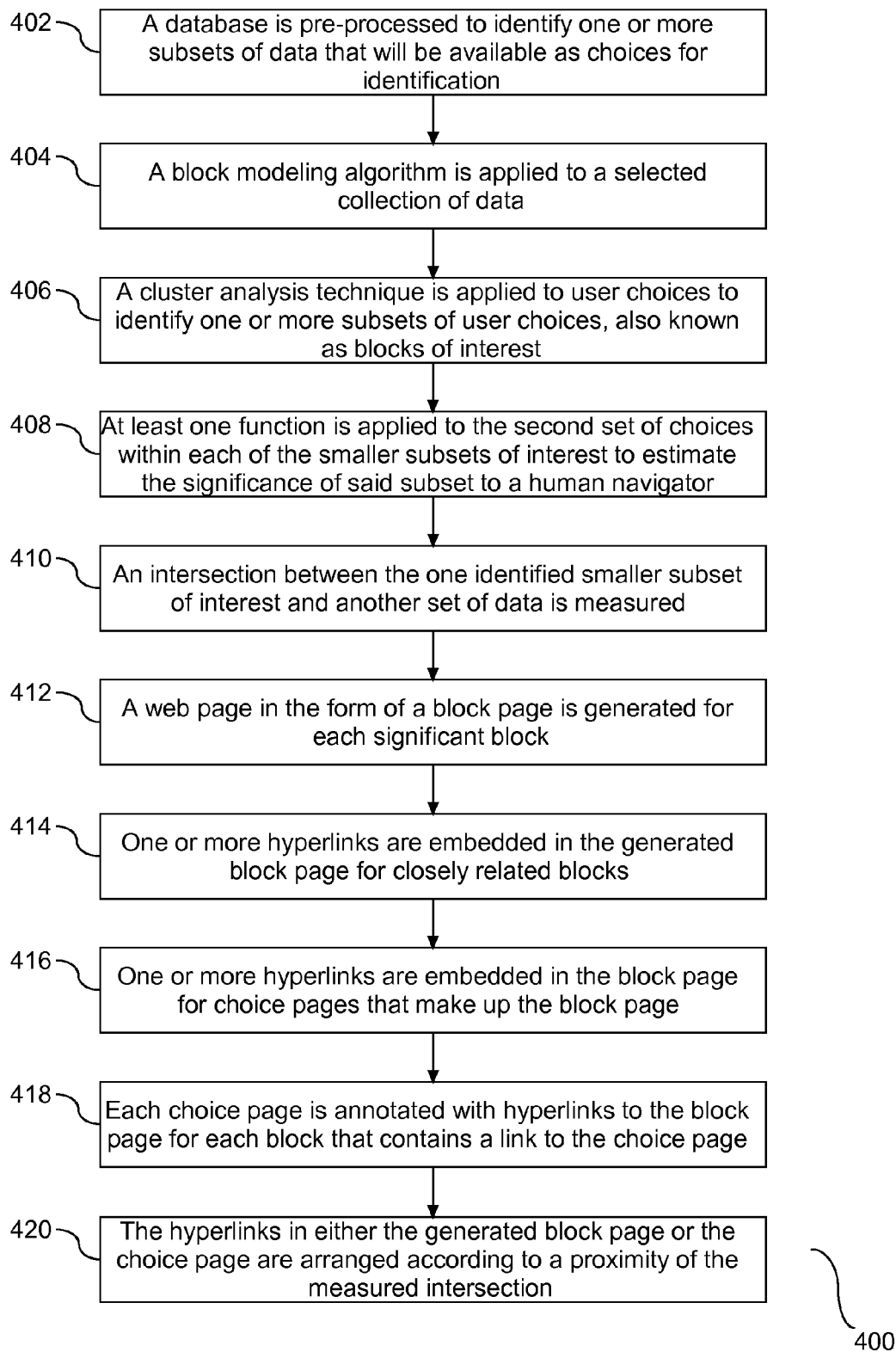
FIG. 4 is a flow chart that outlines the process for creating one or more choice pages and block pages to navigate an online database.

FIG. 4 is a flow chart (400) that outlines a process for creating one or more choice pages and block pages to navigate an online database. Initially, the online database must be configured to identify pertinent data that may later be subject to parsing. More specifically, the database must be pre-processed to identify one or more subsets of data that will be available as choices for identification (402). Each subset within the database may be considered as a collection of tuples, wherein a tuple is an ordered set of data in a database. The ordered set of data constitutes a record. In one embodiment, a tuple may be a data structure in a database with values in the data structure separated by commas, with the values passed to a program or operating system. The identified subsets of data are maintained incrementally as the online database is maintained. Accordingly, the first part of the choice and block page creation is to pre-process the database to organize data into a collection of tuples for data that is already entered in the database and for data that is received as the database is maintained and grows.

Once the pre-processing step (402) is completed, a cluster analysis technique is applied to the selected collection of tuples to identify one or more subsets of user choices (404). The cluster analysis identifies at least one subset of data within a dynamic database available as a set of user choices, also known as clusters of user choices, in the online database that share structural characteristics. In one embodiment, a block modeling algorithm identifies the clusters of choices. The clusters are also known as blocks of interest (406). An equivalence relation allows data to be organized into blocks. At least one function is applied to each block of interest to estimate the significance of the block to a human navigator (408). In one embodiment, the subsets of interest are selected according to the largest values returned from the function. Thereafter, an intersection between blocks of interest, i.e. subsets of interest, is measured (410). This measurement identifies subsets of closely related data. For any two blocks of data an intersection can be measured. A web page in the form of a block page is generated for each significant block (412). The significance of a block is estimated by a function of the choices within the block. The function estimates how interesting a human navigator will find the block. In one embodiment, the simplest such function is equal to the number of choices made or votes cast by users in the block. Similarly, in another embodiment, the significant function could be the total number of dollars spent by users who purchased the products in the block. In yet another embodiment, the significant function could be the sum of the data timestamps on votes cast for choices in the block. Each block page acts as a navigation point for the user. It represents a set of user choices that are equivalent or related in a meaningful way.

In other words, the block page may function as a map page showing the identified subsets that have the highest significance. Accordingly, a block modeling algorithm that is bounded by time and space requirements may be employed to determine the equivalence relation.

One or more hyperlinks may be embedded in the generated block page for closely related blocks (414). In addition, one or more hyperlinks are embedded in the block page for choice pages that correspond to choices within the block (416). Once the hyperlinks are embedded, each choice page is annotated with hyperlinks to the block page for each significant block that contains a link to the choice page (418). In one embodiment, a block list is provided showing the aggregation of blocks, wherein the blocks in the block list are arranged according to the significance of the blocks, e.g. size of the blocks. If multiple blocks on a related block list have the same significance, those are arranged according to the size of their intersection with the given block. Next, the hyperlinks in either the generated block page or the choice page are arranged according to a proximity of the measured intersection, step (420). Accordingly, the block modeling technique is employed with an online database generating block pages and related choice pages with active hyperlinks to join the two types of pages.

As shown in FIG. 4, one or more block modeling techniques may be applied to an online database to automatically create a navigation map that can be embedded as links within an online database of choices. Web pages are currently configured to display choices within the database. By applying one or more block modeling techniques, links are inserted into the database of choices to provide navigation within the database. Choices that are discovered to be related by analysis can be linked together. New navigation pages can be created, wherein the new navigation pages represent equivalence classes. This allows a user of the navigation technique to study selection patterns. Entries of interest in the online database may be found by navigating among the equivalence classes.

Figure 5:
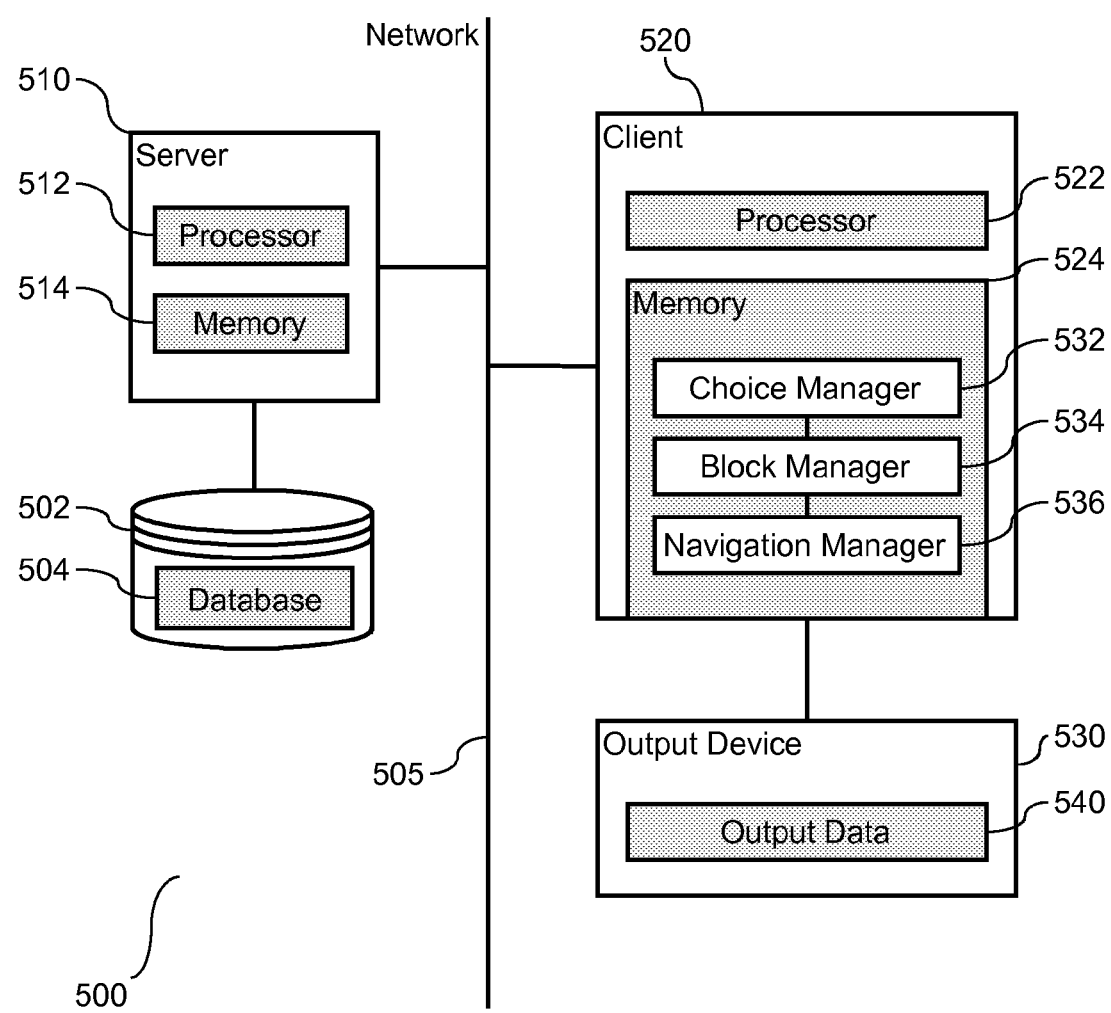
FIG. 5 is a block diagram illustrating components of a computer system utilized to navigate the online database.

Similarly, in one embodiment the invention is implemented in hardware. FIG. 5 is a block diagram (500) illustrating a computer system with a server (510) in communication with a client machine (520) across a network (505). The server has a processor (512) and memory (514), and is in communication with storage media (502). Similarly, the client machine (520) has a processor (522) and memory (524). In addition, an output device (530) is shown in communication with the client machine for display of output data.

A dynamic online database (504) is maintained on the storage media (502). A choice manager (532) is provided in communication with the database (504) to identify one or more subsets of data within the database (504) that are available as a set of user choices. In one embodiment, the choice manager (532) resides on the client machine (520). As shown, the choice manager (532) is a software tool embedded within the client memory (524). A block manager (534) is provided to apply a cluster analysis technique to identify one or more smaller subsets of interest within the set of user choices. The block manager (534) also resides on the client machine and is in communication with the choice manager (532). As shown, the block manager (534) is a software tool embedded within client memory (524). In addition to the choice manager (532) and the block manager (534), the client machine (520) also includes a navigation manager (536) to apply at least one function to smaller subsets of interest. The navigation manager (536) is in communication with both the choice manager (532) and the block manager (534). This application enables the navigation manager (536) to estimate the significance of each subset to a human navigator, and to measure an intersection between at least the one identified smaller subset of interest and another set of data. The navigation manager (536) further identifies subsets of closely related data. Based upon the measured intersection of the sets of data performed by the navigation manager (536), a page (540) of data showing the measured intersection between the sets of data is provided. In one embodiment, the page of data (540) is presented to a user on the output device (532).

In the example shown herein, the choice manager (532), block manager (534), and navigation manager (536) are shown residing in memory (524) of a client machine (520), and utilize instructions in a computer readable medium to navigate the online database (504). The choice manager (532), block manager (534), and navigation manager (536) communicate with the client processor (522). At the same time, the client machine (520) communicates with the server (510) that manages the database (504) maintained on the storage media (502). Similarly, in one embodiment, the choice manager (532), block manager (534), and navigation manager (536) may reside as hardware tools external to the client machine (520) memory (524), or they may be implemented as a combination of hardware and software in the computer system. Accordingly, the managers (532), (534), and (536) may be implemented as software tools, or hardware tools, or a combination of software and hardware tools to facilitate navigation of a dynamic online database.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, or semiconductor system (or apparatus or device). Examples of a computer-readable medium include but are not limited to a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code includes at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

Advantages Over The Prior Art

The application of block modeling techniques to an online database removes the prior art requirement of returning data based upon understanding the content of the data or based upon information collected about a specific user. In fact, the block modeling technique does not attempt to understand the data. Rather, this technique organizes patterns of user's choices without awareness of the content of the choices. Users who want to explore new territory will not be provided hyperlinks to data based upon their own previous choices. The block modeling technique does not take into consideration prior selection, and presents a user independent view of the data.

Alternative Embodiments

It will be appreciated that, although specific embodiments of the invention have been described herein for purposes of illustration, various modifications may be made without departing from the spirit and scope of the invention. In particular, with respect to providing hyperlinks to significant blocks, a graphical diagram, such as a Venn diagram, or a chart may be employed to depict significant related blocks. Each depicted block in the diagram or chart may include a hyperlink to its block page. Accordingly, the scope of protection of this invention is limited only by the following claims and their equivalents.

I claim:

1. A method for navigating an online database comprising:
    identifying at least one subset of data within a dynamic database available as a set of choices for a user, said choices are identified based upon previous choices made by different users, and absent taking into consideration previous choices of the user;
    applying a cluster analysis technique to further identify at least one first subset of interest within the set of user choices, such that each choice within said first subset is equivalent to other choices according to at least one equivalence function;
    applying at least one function to each subset of interest to estimate significance of each subset to a navigator;
    measuring an intersection between at least said one identified subset of interest and another identified subset of interest to further identify subsets of closely related data; and
    generating a first page of data showing identified subsets of highest significance, together with said measured intersection, the first page including a block link list and block list options, the block link list including one or more hyperlinks to subsets of interest where a choice selected from said set of choices is a member and the block list options including criteria associated with ordering of the hyperlinks within the block link list, including presenting to the user selection patterns of other users, said patterns independent of choices made by the user.

2. The method of claim 1, further comprising embedding at least one hyperlink connection into said generated page, wherein each of said hyperlink connections connect a user to an identified subset of interest in a block page.

3. The method of claim 2, further comprising generating a second page as a polling page, said second page representing each of said identified subsets of interest as an aggregation of a selection of choices, including embedding links to pages for identified intersection subsets of interest.

4. The method of claim 3, further comprising arranging hyperlink connections according to an ordering metric of said measured intersection.

5. The method of claim 1, further comprising incrementally maintaining the identified subsets of data based upon their significance.

6. A computer system comprising:
a processor in communication with storage media;
a dynamic online database configured to receive data, said database maintained on said storage media and configured to have said data parsed;
a choice manager in communication with said database to identify at least one subset of data within the database available as a set of choices for a user, said choices are identified based upon previous choices made by different users, and absent taking into consideration previous choices of the user;
a block manager in communication with said choice manager, said block manager to apply a cluster analysis technique to further identify at least one first subset of interest within the set of user choices, such that each choice within said first subset is equivalent to other choices according to at least one equivalence function;
a navigation manager to apply at least one function to each subset of interest to estimate significance of each subset to a navigator, and to measure an intersection between at least said one identified subset of interest and another identified subset of interest to further identify subsets of closely related data; and
a first page of data showing a measured intersection between sets of identified data, the first page including a block link list and block list options, the block link list including one or more hyperlinks to subsets of interest where a choice selected from said set of choices is a member and the block list options including criteria associated with ordering of the hyperlinks within the block link list, including presenting to the user selection patterns of other users, said patterns independent of choices made by the user.

7. The system of claim 6, further comprising said navigation manager to embed at least one hyperlink connection into said generated page, wherein each hyperlink connection connects a user to an identified subset of interest in a block page.

8. The system of claim 7, further comprising generating a second page as a polling page, including said second page to represent each of said identified subsets of interest as an aggregation of a selection of choices, including embedding links to pages for identified intersection subsets of interest.

9. The system of claim 8, further comprising said navigation manager to arrange hyperlink connections according to an ordering metric of said measured intersection.

10. The system of claim 6, further comprising said navigation manager to incrementally maintain the identified subsets of data based upon their significance.

11. A computer program product comprising a computer readable medium including a computer readable program, wherein the computer readable program when executed on a computer causes the computer to:
identify at least one subset of data within a dynamic database available as a set of user choices, said choices are identified based upon previous choices made by different users, and absent taking into consideration previous choices of the user;
apply a cluster analysis technique to further identify at least one first subset of interest within the set of user choices, such that each choice within said first subset is equivalent to other choices according to at least one equivalence function;
apply at least one function to each subset of interest to estimate significance of each subset to a navigator;
measure an intersection between at least said one identified subset of interest and another identified subset of interest to further identify subsets of closely related data; and
generate the first page of data showing identified subsets of highest significance, together with said measured intersection, the first page including a block link list and block list options, the block link list including one or more hyperlinks to subsets of interest where a choice selected from said set of choices is a member and the block list options including criteria associated with ordering of the hyperlinks within the block link list, including presenting to the user selection patterns of other users, said patterns independent of choices made by the user.

12. The computer program product of claim 11, further comprising computer readable program to embed at least one hyperlink connection into said generated page, wherein each of said hyperlink connection connects a user to an identified smaller subset of interest in a block page.

13. The computer program product of claim 12, further comprising generating a second page as a polling page, said second page representing each of said identified subsets of interest as an aggregation of a selection of choices, including computer readable program to embed links to pages for identified intersection subsets of interest.

14. The computer program product of claim 13, further comprising computer readable program to arrange hyperlink connections according to an ordering metric proximity of said measured intersection.

15. The computer program product of claim 11, further comprising computer readable program to incrementally maintain the identified subsets of data based upon their significance.

* * * * *